United States Patent [19]
Brearley et al.

[11] Patent Number: 5,848,672
[45] Date of Patent: Dec. 15, 1998

[54] BRAKE LINING WEAR SENSING SYSTEM

[75] Inventors: Malcolm Brearley, West Midlands; Andrew John Ward, Birmingham; Dennis John McCann, Powys; Paul Antony Fawkes, West Midlands, all of Great Britain

[73] Assignee: Lucas Industries Public Limited Company, West Midlands, Great Britain

[21] Appl. No.: 732,344
[22] PCT Filed: Jun. 6, 1995
[86] PCT No.: PCT/GB95/01306
§ 371 Date: Jan. 6, 1997
§ 102(e) Date: Jan. 6, 1997
[87] PCT Pub. No.: WO95/33933
PCT Pub. Date: Dec. 14, 1995

[30] Foreign Application Priority Data
Jun. 8, 1994 [GB] United Kingdom ............... 9411477

[51] Int. Cl.⁶ .................................................. F16D 66/02
[52] U.S. Cl. .................... 188/1.11 L; 340/453; 340/454
[58] Field of Search ....................... 188/1.11 L; 340/453, 340/454

[56] References Cited

U.S. PATENT DOCUMENTS

| | | | |
|---|---|---|---|
| 4,937,554 | 6/1990 | Herman | 340/453 |
| 5,339,069 | 8/1994 | Penner et al. | 340/454 |

FOREIGN PATENT DOCUMENTS

| | | | |
|---|---|---|---|
| 3816949A1 | 5/1988 | Germany | 188/1.11 L |

*Primary Examiner*—Douglas C. Butler
*Assistant Examiner*—Tyrone M. Lee
*Attorney, Agent, or Firm*—Oblon, Spivak, McClelland, Maier & Neustadt, P.C.

[57] ABSTRACT

A wear sensing system for the brake linings of a vehicle. Since the sensors are mounted within the brake mechanism, the reduction in the disc thickness must be taken into account to supply an accurate reading. A non-volatile memory stores the position of the brake before replacement and is compared to the position after replacement. However, the latter reading is established only after a predetermined number of brake applications to take up any starting clearances.

29 Claims, 9 Drawing Sheets

5,848,672

BRAKE LINING WEAR SENSING SYSTEM

BACKGROUND OF THE INVENTION

1. Field of the Invention

The present invention relates to wear sensing systems for the brake linings of vehicle brakes of the type in which friction linings are applied to a rotatable braking member such as a disc or drum.

2. Discussion of the Background

Lining wear-out sensors have been in operation on vehicles for many years and usually employ conductors which are embedded in the lining and which ground out on the disc or drum or form an electrical circuit which is cut as the wear-out condition is approached. Such sensors thus only provide a warning signal when a particular predetermined wear condition has been achieved.

It will be a requirement of diagnostic systems in the future to provide a sensor which indicates how much lining is left and it is unlikely, for several practical reasons, that such sensors will be incorporated within the brake lining in the traditional manner.

The presently favored approach is thus to position the wear sensor, not within the linings, but rather within the brake mechanism itself. An example of how this can be achieved is described and illustrated in detail in our copending UK Application No. 9320369.3 to which reference is hereby directed and in FIGS. 1 to 4 of drawings accompanying the present Application. If the wear sensors are mounted within the brake mechanism in this type of manner, then the disc thickness or drum inner diameter must be taken into account or the reading will be likely to become progressively greater as the life of the brake increases. Whilst the absolute measurements obtained will become increasingly pessimistic, the disc or drum will be protected but at an increased cost of unused lining.

From DE-A-3816949 there is known a process for monitoring the thickness of brake linings of a disc brake wherein sensors responsive to caliper/disc spacing are operated with simple software to (a) memorize the km. reading at start of first use, (b) take the km. reading when a prescribed test interval is reached, (e.g. when linings 75% worn); (c) establish the number of km, since new to reach 75% worn condition; and (d) establish how many more miles will be available to the prescribed worn-out condition by linear extrapolation. Regular recalibration is made after each mm of detected wear. The measurement signal is generated throughout the service life but, except when the test interval is reached, this is used only for system fault detection. The start of the prescribed interval is predetermined within the system to correspond to the (75%) worn condition. No possibility for changing the starting point for acceptable wear condition signals to be used in calculating "km to go" is accommodated within the system of DE-A-3816949 and the system is therefore unable to take account of wear to the disc itself.

SUMMARY OF THE INVENTION

A primary object of the present invention is thus to provide a means and method for predicting a wear-out point that takes account of wear on the disc or drum with operation life.

According to a first aspect of the present invention, there is provided a lining wear measurement system, operating from a displacement sensor coupled to a moving element within a vehicle brake, the system having a microprocessor controller, a system memory adapted to hold internally in system memory a starting point and a target wear-out point representing a minimum acceptable brake lining thickness based upon the characteristics of known linings; characterised by:

(a) first means within the microprocessor controller for establishing that the brake has been equipped with a new unused set of linings;

(b) second means, effective after it has been established by said first means that the brake has been equipped with a set of new unused linings, to generate and automatically set into the memory a new reference datum for wear measurements; and (c) third means effective to generate and set into the memory a target wear-out point, representing a minimum acceptable brake lining thickness, obtained by subtracting from said new reference datum the known thickness of new unused linings, thereby enabling the target wear-out point to take into account the reducing disc or drum thickness as the life of the brake progresses.

According to a second aspect of the present invention, there is provided a lining wear measurement system, operating from a displacement sensor coupled to a moving element within a vehicle brake, the system having a microprocessor controller, a system memory adapted to hold internally in system memory a starting point and a target wear-out point representing a minimum acceptable brake lining thickness based upon the characteristics of known linings, characterised by:

(a) first means for establishing that the brake has been equipped with a new unused set of linings;

(b) second means, effective after it has been established that the brake has been equipped with a set of new unused linings, to manually initiate the generating and setting into the memory of a new reference datum for wear measurements; and (c) third means effective to generate and set into the memory a target wear-out point, representing a minimum acceptable brake lining thickness, obtained by subtracting from said new reference datum the known thickness of new unused linings, thereby enabling the target wear-out point to take into account the reducing disc or drum thickness as the life of the brake progresses.

Advantageously, said first means is also able to establish that the brake has been re-equipped with a previously fitted set of brake linings and a fourth means is effective to decide to maintain the existing reference datum and target wear-out point in these circumstances.

Advantageously, the system comprises means to recognise an opening operation of the brake, such as is necessary to remove worn linings for inspection or replacement purposes, by comparison of pre-opening and post-opening brake position readings which are taken from measurements, or measurement averages, which are stored in said system memory, at least the pre-opening reading being stored in non-volatile memory so as not to lose data when system power is turned off.

One preferred embodiment includes means whereby the post opening reading after the brake has been opened up is not accepted immediately on detection of said opening or on said manual initiation signal being received but is only accepted after a pre-set substantial number of brake applications, by which time said auto-adjuster has taken up any starting clearances and the post opening measurement has become a true reading of drum/disc and lining dimensions.

Advantageously, the system includes means whereby said accepted post-opening reading, after having the stored pre-opening reading subtracted from it, is tested for use as the new starting point figure by comparing it against a first threshold such that when said first threshold is exceeded this post opening reading is caused to be accepted as a new starting point and a new wear-out target is calculated and overwritten into the non-volatile memory so as to supersede the previous figure and allow this new worn out figure to be compared with subsequent reading averages to calculate the remaining lining thickness for display and brake control purposes.

Preferably, if said first threshold is not exceeded by the post opening reading, the latter reading is arranged to be compared against a second, lower threshold and if it is also not exceeded, the post opening reading is arranged to be abandoned and no change is made to the stored wear-out target point.

Alternatively, if said first threshold is not exceeded but said second threshold is, a new starting point is not set but a default wear-out point is arranged to be set which is higher than would normally be used as it represents the wear-out point with a brand new disc/drum and so prevents any possibility of damage being caused by complete wearing of all lining.

Some embodiments can include means for comparing the lining remaining figure for each brake on an axle with the corresponding figure from the brake at the opposite end of the axle and means for comparing the differential wear measurement obtained with a pre-set wear difference threshold which, if exceeded, is arranged to cause a warning signal to be displayed to the driver or service personnel.

Advantageously, the system can include means for accepting wear signals from a plurality of wear sensors on a multiplex basis, means allowing a display to be switched to each brake in turn to read out the number of the brake being addressed, or an identifying icon, the lining wear remaining and any differential or wear-out warning which is present.

Preferably under normal running, said display is arranged to be automatically set to the braking channel having the minimum lining remaining but can be stepped round all channels on command from a panel button or external signal.

In some embodiments, when the post opening reading is greater than said first threshold and the new starting point is entered, the standard lining dimension total is subtracted from this figure and the result is stored as the rotor dimension in a location in non-volatile memory, for diagnostic purposes.

Preferably, said stored result is arranged to be overwritten at a subsequent point when brake linings are renewed, with a warning being arranged to be given should the disc dimension fall outside of the recommended working range.

Some embodiments can include means for checking for failure of the brake switch operation by counting the number of brake applications which have occurred for every unit wear on the lining dimension, this parameter also being arranged to be used in non-volatile memory over periods of power removal.

Advantageously, the system includes an ECU which receives wheel speed pulses and is arranged to divide these by a pre-set figure stored in NV memory to generate a signal pulse per unit distance or kilometer travelled, means for counting the latter signal and using the same to establish a figure of unit distance or Km travelled per unit lining wear which is stored and updated as use of the lining progresses, and means for making a projection as to the number of units of distance or Km left on each lining.

In a preferred embodiment, the movement sensors are of a type which includes a potentiometer track and a displaceable wiper, and wherein a respective trimming resistor is included in series with the potentiometer tracks of the various movement sensors, the trimming resistors being trimmed to a value which brings the potentiometer output to a specific value when the potentiometer wiper is set at a specific number of electrical turns.

Preferably, said specific number of electrical turns, is selected to be the number of turns which puts the potentiometer at a "default point" at which disc damage cannot occur.

BRIEF DESCRIPTION OF THE DRAWINGS

The invention is described further hereinafter, by way of example only, with reference to the accompanying drawings, in which.

DESCRIPTION OF THE PREFERRED EMBODIMENTS

Figure 1:
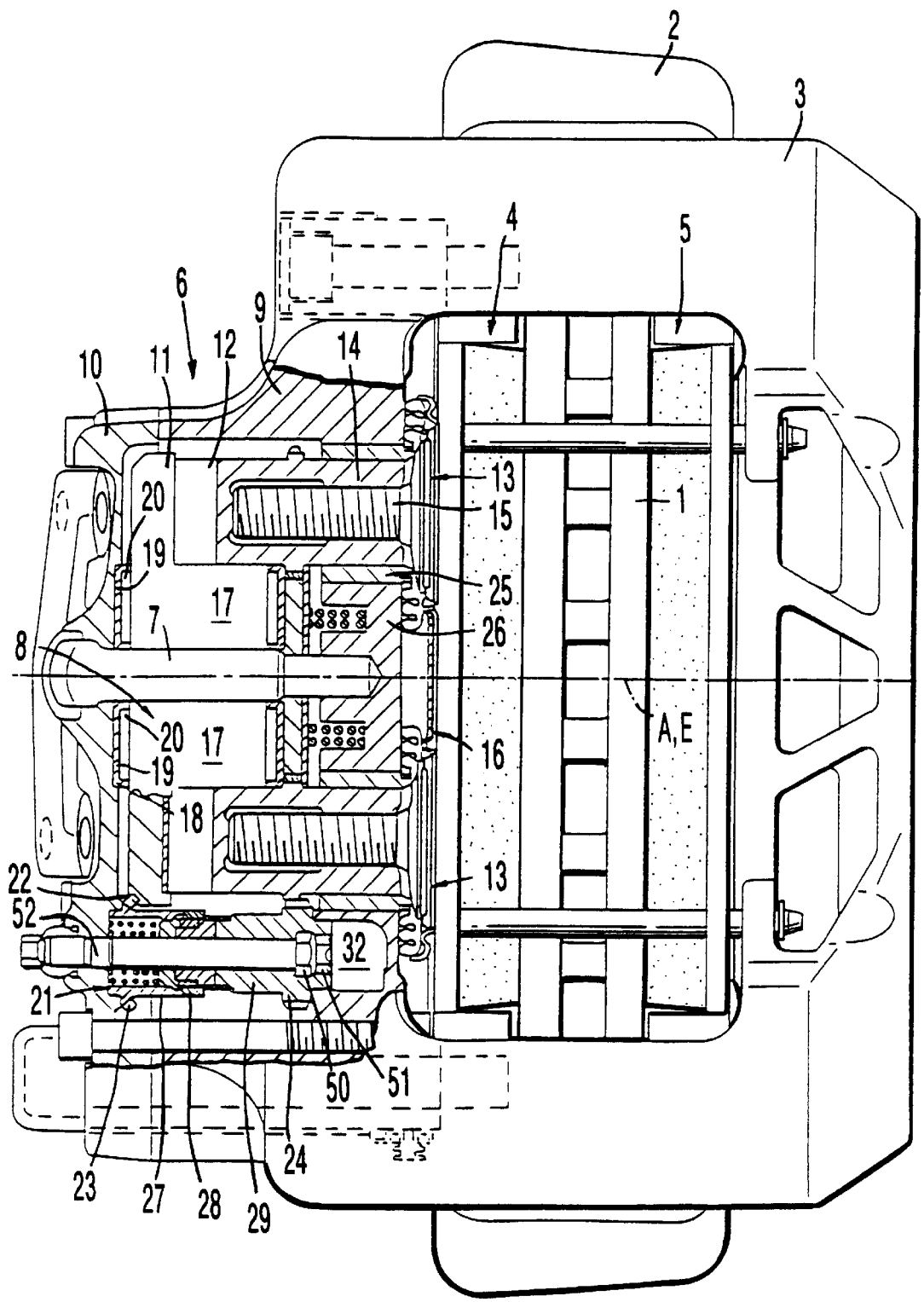
FIG. 1 shows a disc brake assembly in part section, including a brake wear sensor.
Figure 2:
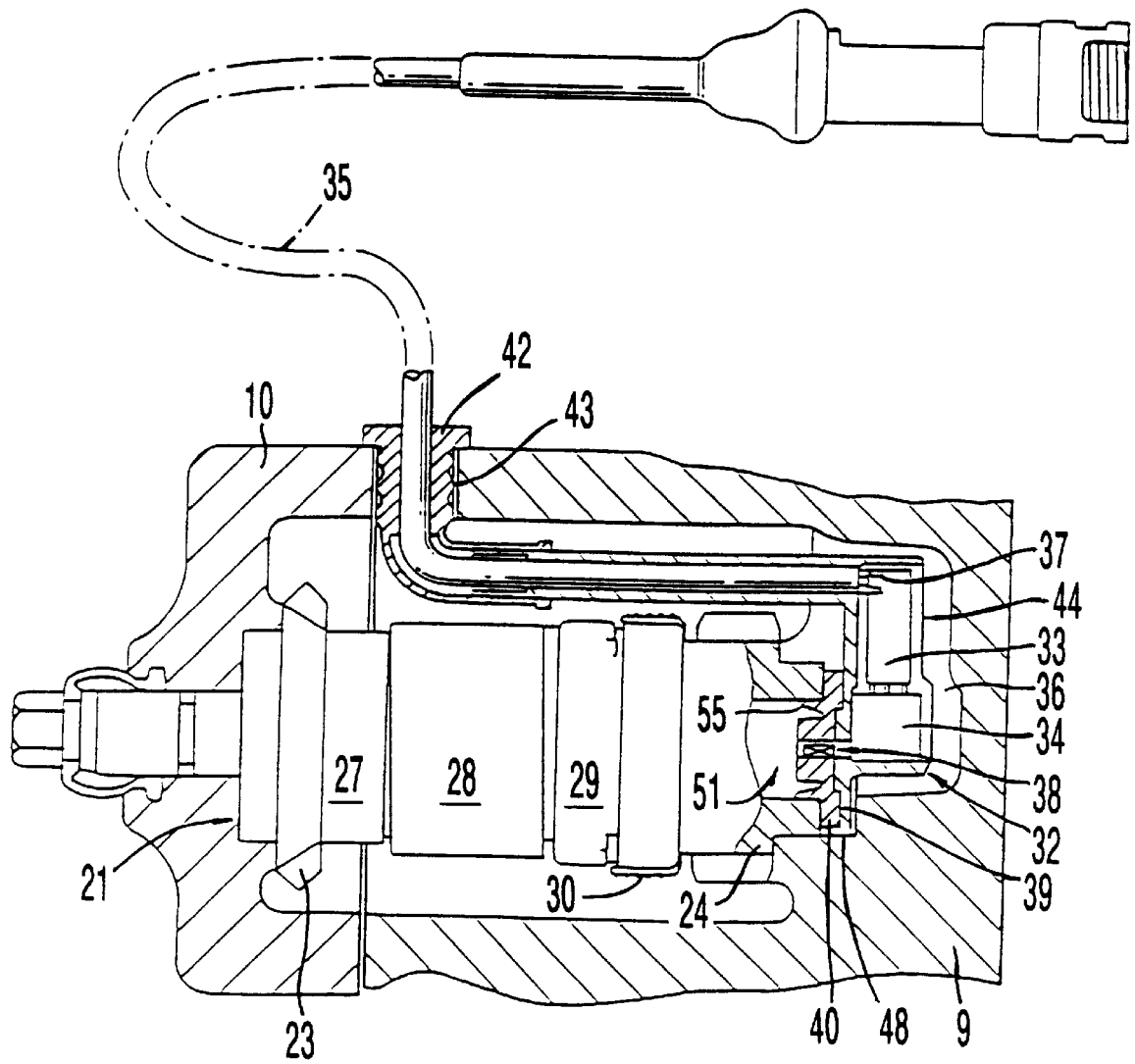
FIG. 2 shows the brake wear sensor of FIG. 1 in section.

There is described first in connection with FIGS. 1 and 2 purely by way of example of the type of brake wear sensor which can be used to provide the brake wear sensor signals in a system in accordance with the present invention, a disc brake assembly having a brake sensor incorporated therein.

Referring to FIG. 1, there is shown a disc brake comprising a brake disc 1 and a brake carrier member 2. A floating caliper 3 encloses two brake pads 4, 5 adapted to be urged towards respective sides of said brake disc. A friction lining is incorporated into each of the brake pads for engagement with opposite faces of the disc.

A brake actuating device 6 is provided to actuate the left hand brake pad in FIG. 1, i.e. the inboard brake pad 4 of the brake when mounted in a vehicle, to urge this brake pad to the right in FIG. 1 against the brake disc 1. Forces of reaction result when the inner brake pad 4 is urged into contact with the brake disc 1, and these reactive forces displace the floating caliper 3 to the left in FIG. 1, thereby also pressing the outer brake pad 5, which is supported on the floating caliper, against the brake disc 1.

The actuator member 7 is an integral part of a rotary member 8 which is enclosed by a casing 9 and its cover 10. Two adjustable tappets 13 are provided in the casing 9 of the actuating device 10. Each of these tappets comprises a first threaded member 14 and a second threaded member 15 and the tappets are disposed at either side of a plane of symmetry E, parallel to and spaced from the same. The two second threaded members 15 are interconnected by a thin metal plate 16 so that they cannot rotate, the metal plate at the same time serving as a heat shield.

The rotary member 8 comprises two eccentrics 11 which are arranged in a terminal zone of the rotary member, acting through a cylindrical roller body 12, each on a respective one of the first threaded members 14. The rotary member 8 is formed with a pair of journal pins 17 between the two eccentrics 11, which journal pins are supported in a depression 18 at the inside of the cover 10 of the casing through an outer ring 19 of a respective needle bearing 20. Both first threaded members 14 are connected to the rotary member 8 by a gear connection which comprises an angle drive and a coupling arrangement 20. Also the angle drive is formed by meshing bevel teeth 22 and 23. A pinion 24 engages directly in external toothing 25 on the adjacent first threaded member 14 and only then does an intermediate gear 26 follow which meshes with the external toothings of both first threaded member.

The pinion 24 is formed with an inner hexagon 50 which is associated with an outer hexagon 51 found on the return shaft 52.

On actuation of the brake, rotation of the rotary member 8 caused by the pivoting of the actuator member 7 is converted by the angle drive formed by the two bevel toothings 22 and 23 into rotation of a first sleeve 27 supported on the return shaft of the coupling arrangement. Once a rotational clearance has been overcome between discs 28 of the coupling arrangement and a second sleeve 29, also supported on the return shaft, a torque will act on the second sleeve 29, via a wrap spring 30, onto the pinion 24 and finally onto the first threaded member 14 by way of the intermediate gear 26 and the external toothing 25.

The threaded member, however, will not rotate if a brake release clearance has been overcome by the above mentioned rotational clearance, so that the two brake pads 4,5 have engaged the brake disc 1 which consequently transmits a reactive force, corresponding with the actuating force, to the two eccentrics 11 through the tappet formed by the two threaded members 14, 15. The friction occurring in the readjustment thread pair 13 on that occasion is greater than the torque which the coupling 21 can transmit.

If the rotational clearance between the disc 28 and the second sleeve 29 is overcome upon actuation of the brake and if the brake pads 4, 5 do not reach the brake disc 1 to give rise to a corresponding reactive force, rotation of the first sleeve 27 will be transmitted through the stack of discs 28 to the second sleeve 29 and on through the wrap spring 30 to the pinion 24 and finally to the first threaded member 14, which consequently will be turned in the sense that the tappet it presents, together with the second threaded member 15, becomes longer.

On release of the brake, the rotational movement of the rotary member 8, which is now in the opposite sense, is transmitted to the first sleeve 27 but not further on to the pinion 24 because, in this direction of rotation, the wrap spring 30 opens and thus prevents the pinion 24 from accompanying the rotational movement.

Thus, it can be seen that by driving a wear sensing means, comprising a sensor 32, from the coupling arrangement 20, the sensor 32 will only be cycled when the rotational clearance between the discs 28 and the second sleeve 29 has been overcome, that is when a predetermined brake clearance is exceeded and the auto-adjuster operates to move the brake pads 4, 5 to a new optimum position in relation to the brake disc 1.

It is convenient to make the adjuster load-insensitive. In this way, if the brakes are applied too hard, the adjuster slips to prevent an over-adjustment of the sensor that would give rise to a false signal.

The sensor 32 is in the form of a band wear sensor which is located in a cavity of a housing of the caliper 3 into which the coupling arrangement 21 extends. The band wear sensor is shown in greater detail in FIG. 2.

The main components of this particular sensor 32 are a printed circuit board 33 mounted on a multi-turn rotary trimming potentiometer 34.

The potentiometer 34 is connected to a drive pin 38 within the coupling arrangement 21. The drive pin is guided within the sensor housing 39 to provide an increased bearing length and to aid in centralizing the drive pin 38 to the drive mechanism of the coupling arrangement 21.

The potentiometer 34 is mounted with a cable 35 enclosing wires attached in a housing 34 that allows the potentiometer and the wires to be encapsulated to provide a sealed chamber 36 for the potentiometer 34 and the wire connections 37.

The housing 39 allows the sensor 13 to rotate with respect to the brake assembly. The degree of rotation is defined by a clearance between the extention 44 of the housing and the walls 46 of the cavity in the brake housing into which the sensor assembly is fitted.

Figure 3:
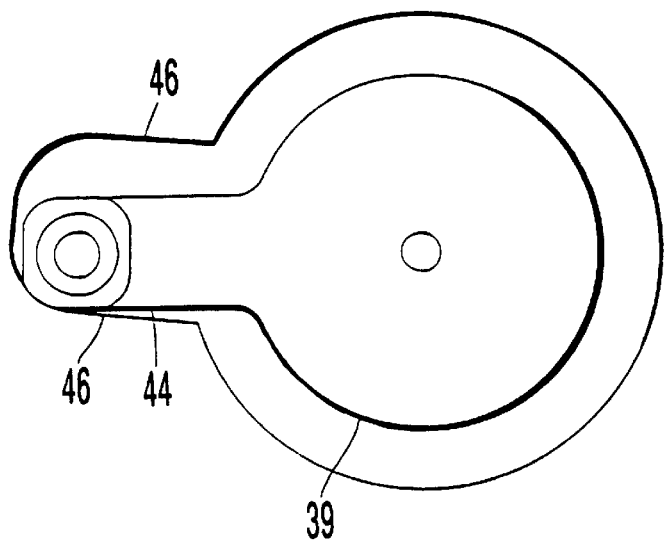
FIG. 3 shows an end view of a drive assembly for use with the sensor.
Figure 4:
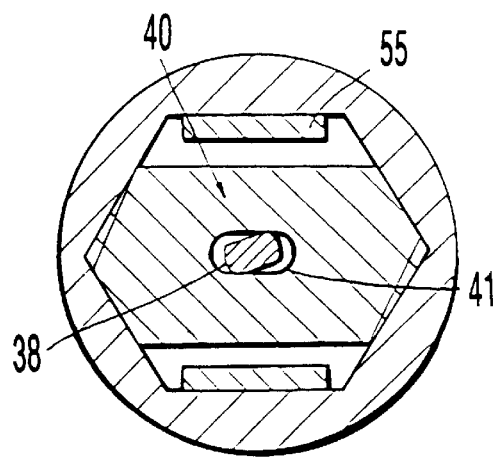
FIG. 4 shows in section the wheel adjuster and drive shaft of the drive assembly.

The sensor 32 as indicated is designed to be driven from the brake auto-adjustment mechanism. The drive interface allows for a connection between the hexagon drive 40 in the adjuster wheel and the potentiometer drive pin 38 as shown in FIG. 3.

The hexagon drive disc 40 is located between the pinion 24 and the sensor housing 39. The drive disc 40 is provided with a drive slot 41 through which the drive pin 38 extends. The drive disc 40 is provided with legs 55 which engage the inner surface of the outer hexagon 51 as shown in FIG. 2.

By suitable sizing of the drive slot 41 in the drive disc 40, this arrangement provides for sufficient backlash within the drive mechanism to prevent vibrational movement of the sensor assembly causing rotation of the potentiometer. The backlash is equivalent to the free travel and is sufficient to avoid a ripple occurring in the output of the sensor. On de-adjustment of the brake, some impact resistance is provided to avoid damage to the sensor's main element should excessive force be used in engaging the de-adjuster stem 38 by earthing out the load through the hexagon, the potentiometer housing and finally an abutment surface 48 on the brake housing.

The cable 35 enclosing the electrical wires connected to the sensor element must exit the brake housing cavity at the source point. This chamber 36 must remain sealed from atmospheric contaminants when the sensor is installed. A D-shaped wire seal 42 fits onto the wire and into a D-shaped slot 43 machined into the brake housing at the cover plate 10 to housing 9 outer face.

Conveniently the wires enclosed by the cable 35 are all directed away from the printed circuit board 33 and are guided towards the exit to the brake housing by the extension 44 to the sensor housing.

This design has the advantage that the sensor 32 and coupling arrangement can be completely assembled before being fitted into the brake assembly.

In order to operate effectively, the sensor 32 and the brake have to be assembled with the relationship between them known to enable the rotation of the adjuster to be monitored such that the electrical output can be related to the total pad lining wear.

To obtain this relationship the sensor assembly is first fitted to the end of the auto-adjuster mechanism (coupling arrangement 21). The auto-adjuster and sensor are then installed into the brake assembly. The gears on the tappet housing (first threaded member 14) and the adjacent eccentric 11 without rotating the sensor element.

Further details of the structure and operation of the type of brake shown in FIGS. 1 to 4 can be found in our International Application No PCT/EP93/01101 (WO93/22579) to which reference is hereby directed.

It is stressed again that the aforegoing description is included purely by way of example of a typical wear sensor to which the present invention is applicable and the invention is therefore not limited to this particular type of sensor.

Figure 5:
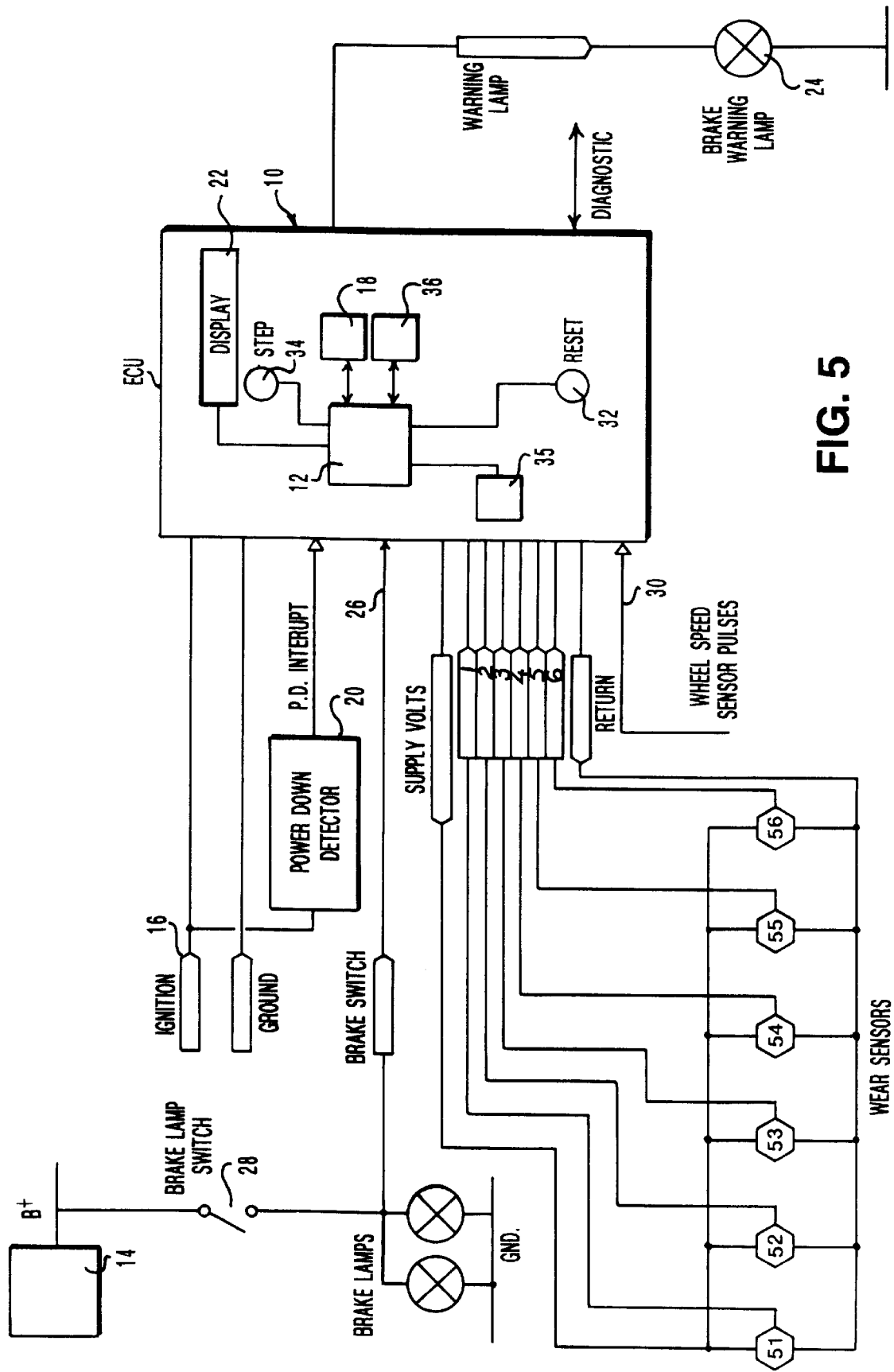
FIG. 5 is an overall connection diagram, of a first lining wear sensing system in accordance with the present invention.

Referring now to FIG. 5, there is shown an overall connection diagram of one possible wear sensor system in accordance with the present invention. The particular system takes its primary measurements from six wear sensors $S_1$–$S_6$ located respectively within six different brake mechanisms (not shown in FIG. 5) of the vehicle, for example as shown in our aforementioned UK Application No 9320369.3, and in present FIGS. 1 to 4.

These sensors $S_1$–$S_6$ provide readings on command to a system electronic control unit (ECU) 10 which is based on a microprocessor 112 which may be of the general type manufactured by Hitachi and sold in the UK under the name H8 series.

The sensors $S_1$–$S_6$ are preferably displacement transducers incorporated into the brakes so as to measure, preferably in an absolute manner, the position of a selected brake member, the movement of which with time is indicative of the wear condition of the linings. The sensors can be analogue or digital devices and, if the former, the resulting signals are converted into digital values by suitable A/D convertors 135 for processing by the ECU microprocessor 112. Processing can be achieved on multiplex basis by scan control which is a programmed part of the ECU microprocessor, as is the following analogue-digital convertor.

The ECU 110 is powered from the vehicle battery supply 114 via the ignition key switch 116 so as to present no drain in the shutdown condition. The ECU 110 contains a section 118 of read/write memory which is non-volatile (NV RAM) and is used to store system data during power-off periods. The start of such power -off periods is detected rapidly at each fall in the supply voltage to the ECU by a power down detector 120 of the type which is well known to ECU designers (and is therefore not described in detail herein) and by which many bytes of data can be stored in the NV RAM 118 before the stabilized power rail which supplies the microprocessor 112 falls to a point where it becomes unreliable.

The ECU 110 can optionally incorporate a display 122 which can be switched to display the wear sensor output of a selected channel ($S_1$–$S_6$) along with an identifier for that channel. Preferably, the display 122 presents the remaining lining wear, calculated as described hereinafter and described herein as "wear-to-go", in a suitable of percentage thickness units for driver or service personnel.

The display 122 will normally show the lowest wear-to-go figure of all channels being examined but a manual stepping button 134 can be provided to allow a period of viewing, preferably a fixed period, of any channel, selected by repeated pressing of the step button 134.

The system also preferably includes a warning lamp 124 which is illuminated by the ECU should any brake show a lining with wear equal to or exceeding a critical wear-out target beyond which disc or drum damage is threatened. This warning lamp 124 would normally be positioned on the vehicle dashboard.

Information gathering can be improved by additional input signals to the ECU on a line 126 from the vehicle brake lamp switch 128 and input signals to the ECU from wheel speed sensors (not shown) on a line 130. An optional manual reset button 132 can be provided which is to be pressed when new linings are installed. The latter button 132 is not strictly essential since the system is designed, as described hereinafter, to make this decision automatically, However, a manual input can assist in marginal cases where a disc or drum is worn below the recommended minimum thickness.

Vehicle brakes are usually equipped with auto-adjusters by which, as the lining on the brake shoes wears out the position of the brake shoes is adjusted automatically to maintain the required relationship of the operative faces of the brake linings with the brake disc or drum. Servicing brakes which are equipped with auto-adjusters requires that the adjustor be manually backed-off to "open" the brake so that linings can be removed and inspected or new linings fitted. After this, the adjuster may be set forward but the value of this movement is not known in advance, it being likely that in practice wider than normal clearances remain. Actual brake member positions/wheel cylinder or pistons/tappets are reassembled in a different position to previously and this factor can be used by the ECU as indication that the brake has been disturbed and should be considered for automatic reset, i.e., a new value of wear-out position target should be substituted. This cannot, however, be made until clearances have been reduced to the normal low working level and this can take a substantial number of stops depending upon the type of brake being monitored. A pre-set requirement in this connection is programmed into the ECU and after completion the disc thickness can be assessed and the wear-out point calculated and over-written in the NV RAM 118 in place of the earlier figures.

The principal tasks and preferred functions of the ECU are shown in the flow diagrams of FIGS. 6 to 12 which are now described in more detail.

Figure 6:
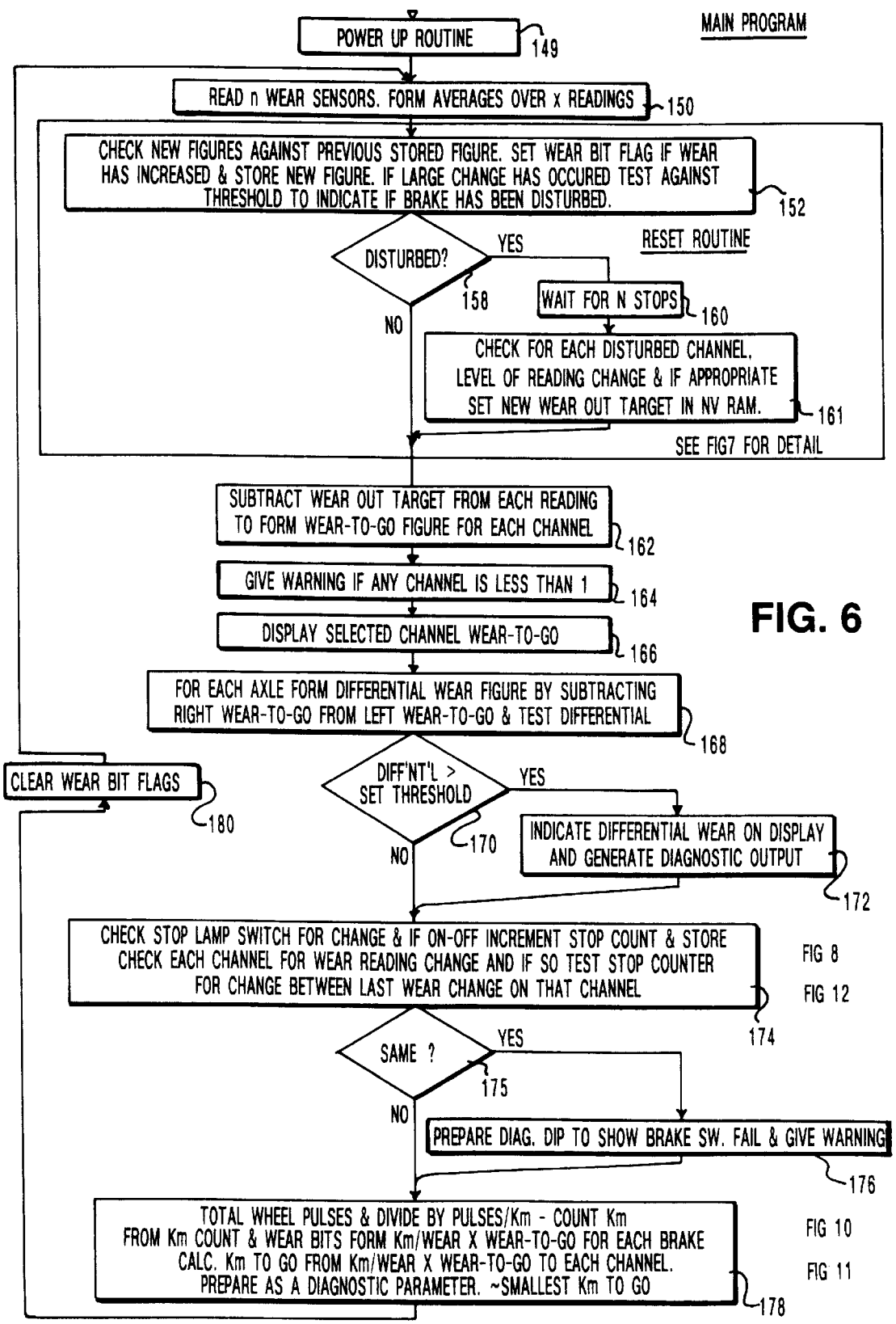
FIG. 6 is a flow diagram showing the functional operations performed by one example of the system of FIG. 5.

The various boxes of FIG. 6 identify the following steps:

149—Power up routine

150—read n wear sensors. Form averages over x readings.

152—Check new figures against previous stored figure. Set wear bit flag if wear has increased and store new figure. If large change has occurred, test against threshold to indicate if brake has been disturbed.

158—Disturbed?

160—Wait for N stops

161—Check for each disturbed channel, level of reading change and, if appropriate, set new wear-out target in NV RAM.

162—Subtract wear-out target from each reading to from wear-to-go figure for each channel.

164—Give warning if any channel is less than 1.

166—Display selected channel wear-to-go.

168—For each axle, form differential wear figure by subtracting right wear-to-go from left wear-to-go and test differential.

170—Differential greater than set threshold?

172—Indicate differential wear on display and generate diagnostic output.

174—check stop lamp switch for change and if ON-OFF. Increment stop count and store. Check each channel for wear reading change and if so test stop count for change between last wear change on that channel.

175—Same?

176—Prepare diagnostic output to show brake switch failure and give warning.

178—Total wheel pulser and divide by pulses/Km–count/Km from Km count and wear bits. Form Km/wear bit for each brake. Calculate Km to go from Km/wear X wear-to-go for each channel. Prepare as a diagnostic parameter≈smallest Km to go.

180—Clear wear bit flags.

FIG. 6 shows an overview of the system function which involves continuously reading each sensor $S_1$–$S_6$ in turn, forming average readings of the wear position for each channel over x samples and calculating the wear-to-go figures for each against individually stored wear-out target positions.

The power up routine of FIG. 6 is entered at ignition switch-on by an external reset pulse and transfers all the parameters which may be modified frequently such as Km and stop counts, last reading for each channel and wear-out targets, into normal RAM 136 (FIG. 5). A scan is made at step 150 of each channel sensor reading and repeated a substantial number (x) of times to reduce the effect of any noise on the reading. The average figures obtained are compared in step 152 with stored previous average and if there has been any increase in wear a channel wear bit flag is set (see step 254 in FIG. 5). The comparison is also tested in step 152 for substantial difference (see step 256 in FIG. 5). Ordinarily this will only take place in the "reducing wear direction" and detection means that the brake has been disturbed to gain access to the lining.

Figure 7A:
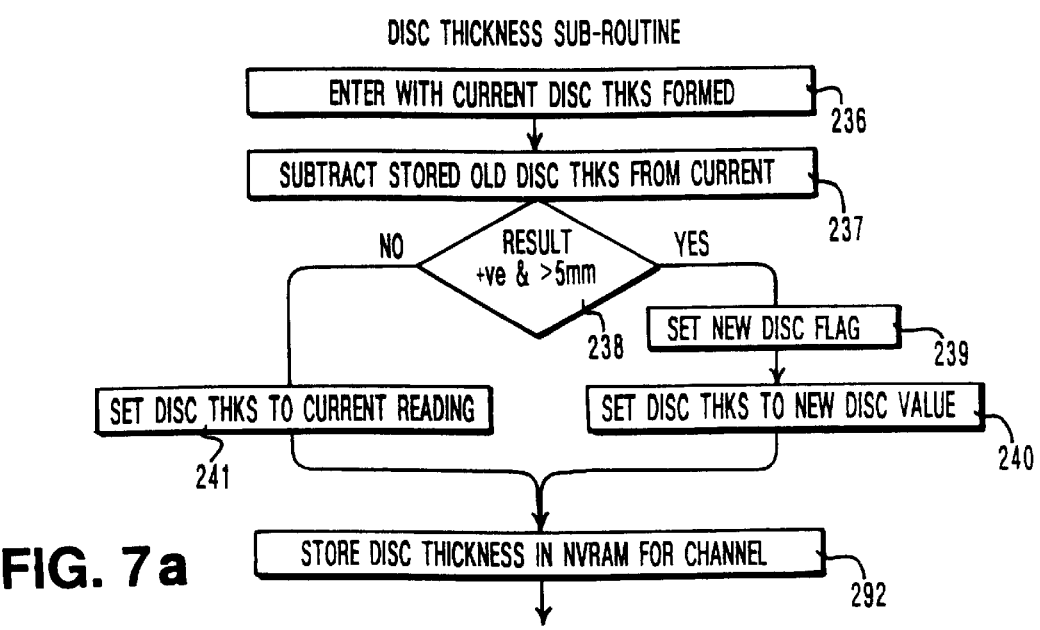
FIG. 7 is a flow diagram of a reset routine which can be performed by the system of FIG. 5.
Figure 7:
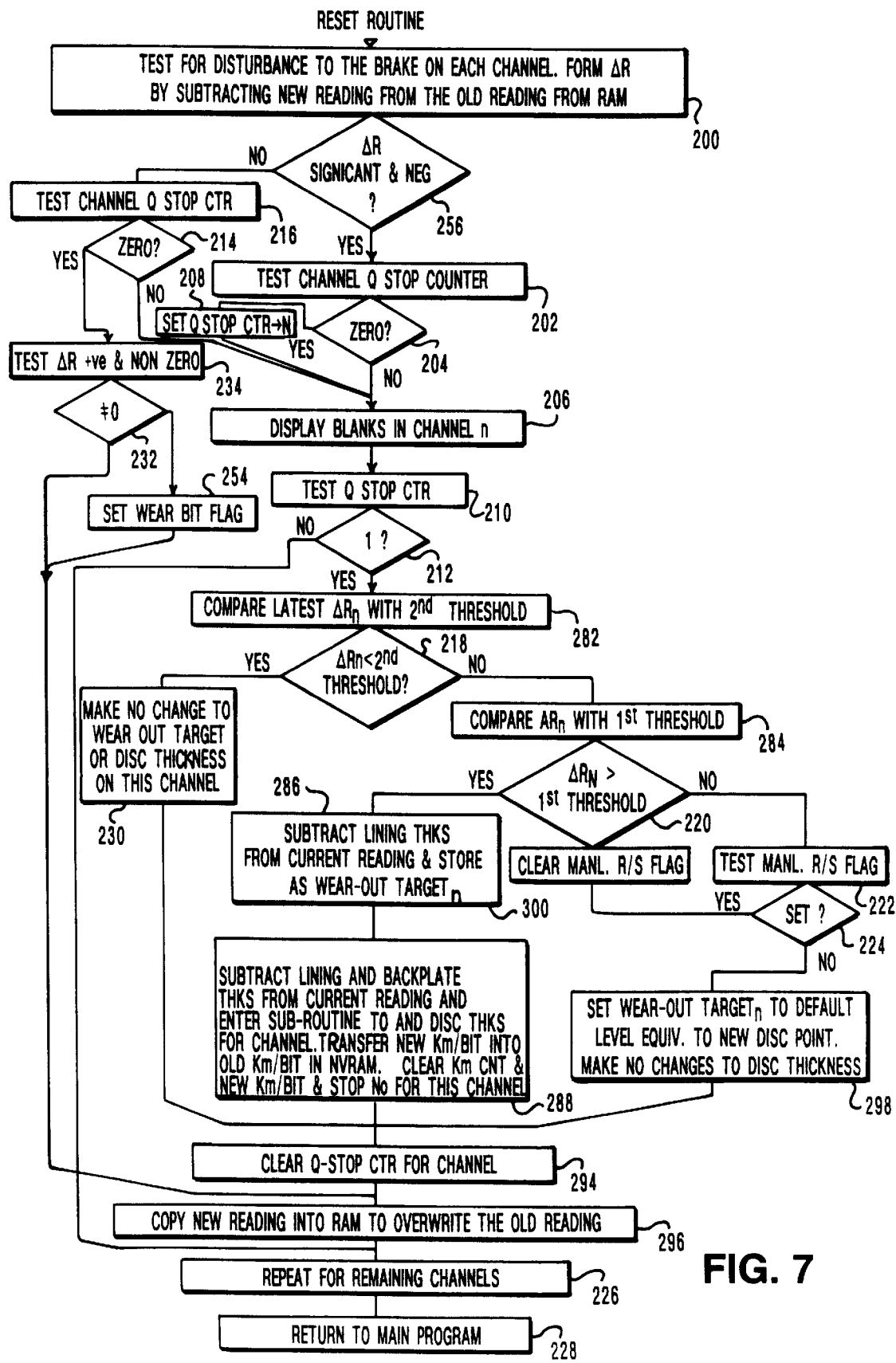

Detection of the occurrence of such disturbance at step 158 in FIG. 6 carries the requirement to wait for N stops at step 160 to allow pad/disc/drum clearances to settle before testing for one of three conditions as described further hereinafter, two of which conditions have to result in a new wear-out target figure being set for that channel, as is shown in FIG. 7. When if required, this is done, the stored wear-out target for each channel is subtracted at step 162 in FIG. 6 from the corresponding channel readings to obtain a "wear-to-go" figure for each channel. Each channel wear-to-go figure is tested at 164 for being less than a set low threshold, typically 1, and a main warning is given by step 166 if this wear-out condition is detected. FIG. 5 shows the main warning being given by lamp 124 but an alternative or additional audible warning device is also possible; either versions can optionally be linked to the brake pedal operation to ease identification.

Differential wear across an axle provides a useful parameter which points to a deteriorating lining condition or actuation efficiency and can be readily obtained from a subtraction of left and right wear-to-go figures at 168 in FIG. 6. The difference figures obtained at 168 are compared at 170 with a pre-set differential threshold to determine the significance of its wear imbalance. Serious imbalance exceeds the threshold at 170 and a diagnostic output message is given at 172 which may be used to correct the braking if the vehicle is equipped with an electro-pneumatic braking system.

Figure 12:
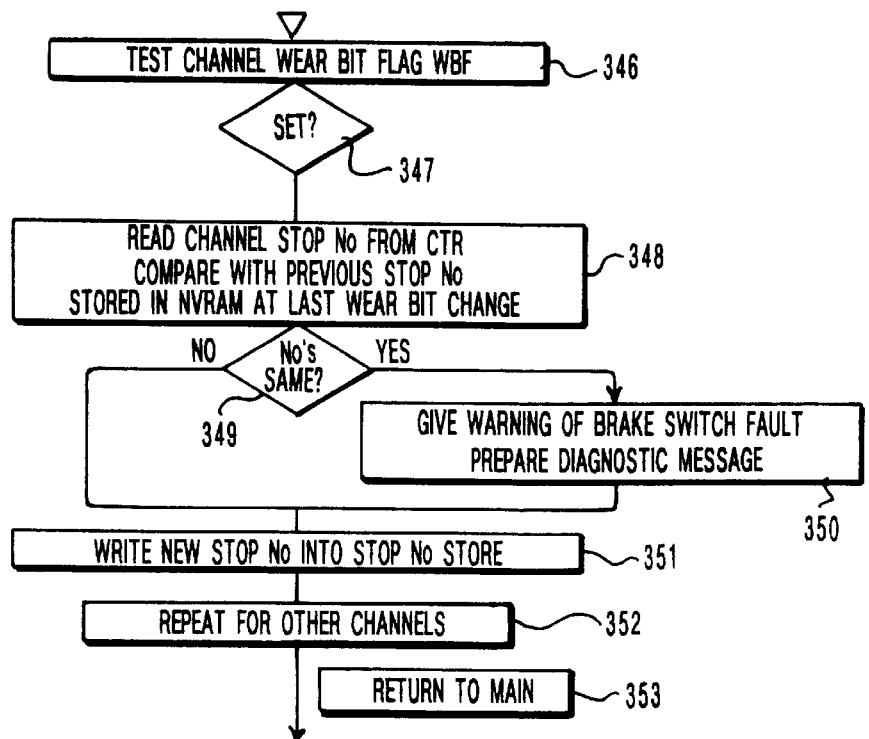
FIG. 12 is a flow diagram of a stop switch check routine which can be performed by the system of FIG. 5.

The stop switch 128 (FIG. 5) can be arranged to play an important part in the system which, under post-disturbance conditions, must wait for N stops before readings of dimensions can be considered as reliable. It is useful therefore to check that this step is operating (see FIGS. 8 and 12). This is performed at 174 in FIG. 6 by counting the number of stops per unit (bit) wear in each brake lining. A running count of stop switch operations is made and when a wear bit flag is found to be set to indicate that unit wear has been measured, the previous stored bit-change-stop-count is subtracted from the present count (FIG. 12). If there has been no change then the stop switch is determined to be faulty and a warning and diagnostic message is produced at 350 in FIG. 12.

Figure 10:
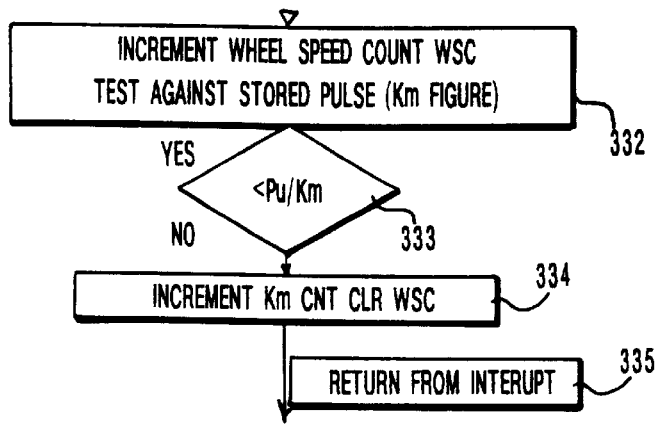
FIG. 10 is a flow diagram of a wheel speed pulse interrupt routine which can be performed by the system of FIG. 5.
Figure 11:
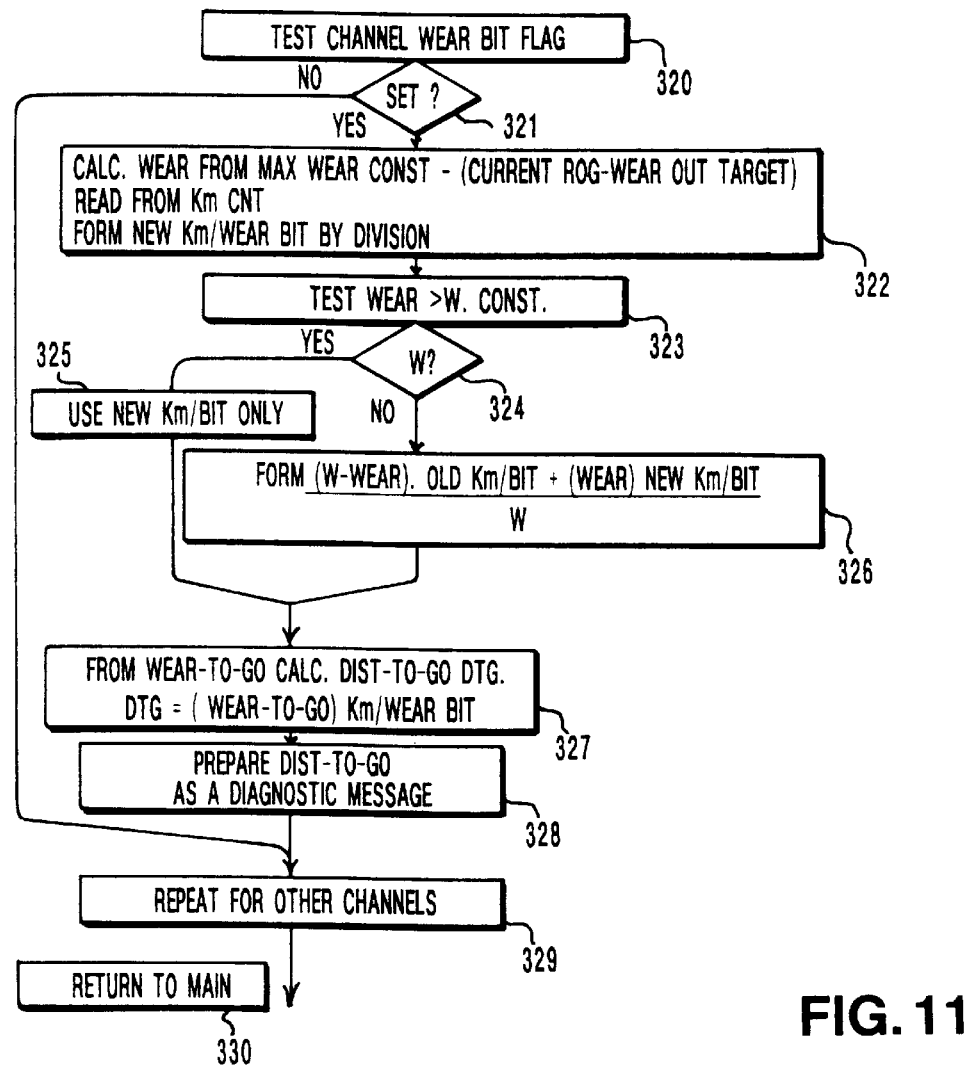
FIG. 11 is a flow diagram of a wear rate calculation routine which can be performed by the system of FIG. 5.

The most useful information which can be produced for drivers is the "distance left to go" on each set of brake linings and preferably this should improve in accuracy as the linings nears the wear limit. Any such prediction is based on historical data so of course an unusually demanding route which is a complete change to the normal routes generates optimism problems. However, excepting this case which requires human interpretation judgment, use of a kilometer counter allied to wear recorded can be used by the system to provide data to derive a Km/wear bit parameter. This can be extrapolated at any point during the life of the linings but to best effect is performed after substantial wear has taken place, by multiplying at 78 in FIG. 6 the latest figure by the wear-to-go data which is current. The minimum figure for brakes on the vehicle is placed in a diagnostic message for service use. The cycle repeats after any wear bit flags are cleared at 80 and all cycles are subject to interrupts which accept wheel speed pulses at lower priority and power removal at high priority. The operating functions for distance-to-go detection are shown in FIGS. 10 and 11.

FIG. 7 shows the reset functions entered when the test which compares the new wear reading against the corresponding old reading made at last sample or, more likely stored in NV RAM as the power was being switched off. This is where a disturbance to a brake has taken place which has the adjuster repositioned manually, probably as part of a service routine. Normal vehicle operation should produce a steady adjuster movement in that direction which takes up slack as the lining wear is absorbed. Any movement resulting from opening the brake will make ΔR (ie old reading minus new reading) negative and significant and forms a signal that some reset of the measurement datum is appropriate.

The three courses of action mentioned hereinbefore are possible and the system must test the readings which take place over the next N stops, where N is that number of stops which the adjuster takes to achieve the normal small running clearances and may typically be in the range 50–100. After this adjustment phase, tests are made with ΔR derived by subtracting each new reading from the stored old reading held from before the brake was opened and a decision on the course of action depends upon the comparison of R against two thresholds, a small second threshold and a continuously larger first threshold.

the various boxes of the RESET ROUTINE of FIG. 7 identifying the following steps:

200—Test for disturbance to the brake on each channel. Form $\Delta R_n$ by subtracting new reading from the old reading taken from RAM.

256—$\Delta R_n$ significant and negative?

202—Test channel zero stop counter.

204—Zero?

206—Display blanks in channel n

208—Set zero stop counter→N.

210—Test zero stop counter

212—1?

214—Zero?

216—Test channel zero stop counter

282—compare latest $\Delta Rn$ with 2nd threshold.

218—$\Delta Rn$ less than 2nd threshold?

284—Compare $\Delta Rn$ with 1st threshold

286—subtract lining thickness from current reading and store as wear-out target$_n$.

220—$\Delta Rn$ greater than 1st threshold?

300—Clear manual reset flag

222—Test manual reset flag

224—Set?

298—Set wear-out target n to default level equivalent to new disc point. Make no change to disc thickness.

288—subtract lining and backplate thickness from current reading and enter sub-routine to find, disc thickness for channel. Transfer new Km/bit into old Km/bit in NV RAM. Clear Km counter and new Km/bit and stop No for this channel.

294—Clear zero stop counter for channel.

296—Copy new reading into RAM to overwrite the old reading

226—Repeat for remaining channels

228—Return to main program

230—Make no change to wear-out target or disc thickness on this channel

254—Set wear bit flag.

232—not equal to zero

234—Test $\Delta R$ positive and non-zero

The various boxes of the DISC THICKNESS sub-routine of FIG. 7a identify the following steps 236—enter with current disc thickness formed 237—Subtract stored old disc thickness from current.

238—Result positive and greater than 5mm?

239—Set new disc flag.

240—Set disc thickness to new disc value

241—Set disc thickness to current reading.

292—Store disc thickness in NV RAM for channel

Comparison is first made at 282 in FIG. 7 with a smaller second threshold and if the reading difference $\Delta R$ is that this value no change is made to the wear-out target or disc thickness record, i.e. the old stored figures are used instead. Typical of this case would be removal of pads for inspection only, with the same pads being refitted, causing a return to the starting position after slack take-up by the auto-adjuster. If this condition is not met, $\Delta R$ is tested at 284 for being greater than the larger first threshold and if found to be so is taken as being indicative of new linings having replaced the old ones as is the normal service operation. If this is the case, then reset must take place to accept a new wear out target calculated by subtracting at 286 the pre-known (programmed) lining thickness from the current reading. Also the disc thickness is assessed by subtracting at 288 the total lining and backplate thickness from this same current reading. The sub-routine shown in FIG. 7a tests the current disc thickness measurement against the old stored value and normally will detect a reducing dimension. However, an increasing dimension more than 5 mm greater than the last stored figure at 238 is indicative of a new disc having been installed and a new disc dimension is entered at 292 and flag set to allow a distance count to be started should this be required for wear recording purposes.

The third possible action is where the $\Delta R$ figure lies between thresholds 1 and 2 and the course of action to be taken is set to prevent ultimate disc or drum damage by assigning a wear-out point which is a safety default dimension which assumes a new disc. This condition may result from replacing worn linings with less worn linings or from some disc machining operations.

At this point, the zero stop counter is cleared at 194 and, for new linings being detected, the Km/bit figure is updated from the last value determined from the old-linings. The Km count stop number and the new Km/bit are all cleared and the new sensor reading is now allowed at 296 to overwrite the old reading in RAM which will then be copied into non-volatile NV,RAM at the next power down signal interrupt routine. This reset routine is then repeated for all other channels which allows for the brakes to be serviced all together or individually.

In some cases the manual reset button 32 (FIG. 5) is provided and would be pressed when power is switched an after brake(s) have been inspected or serviced. This sets a memory which must be maintained during the next N stops and the signal is used as shown in FIG. 7 where the $\Delta R$ figure lies in between the two test thresholds. The manual button memory being set, causes at 298 a new lining condition to be assumed instead of the default which would have otherwise been set. The manual button memory at 300 is reset for that channel once the information has been used.

Figure 9:
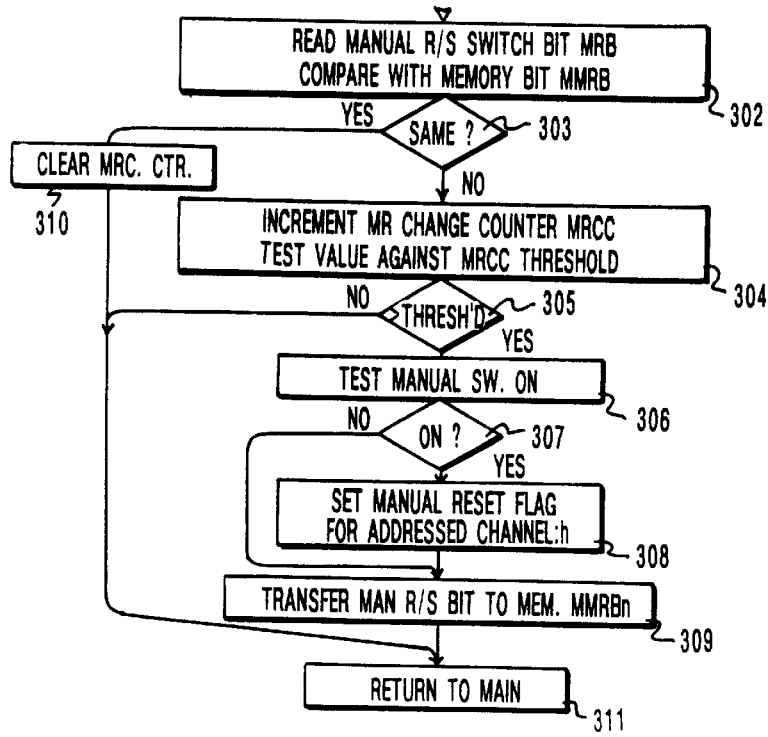
FIG. 9 is a flow diagram of a manual reset switch routine which can be performed by the system of FIG. 5.

FIG. 9 shows the simple routine for testing the manual button and setting the memory only after this has been pressed for a pre-set period so as to avoid accidental latch-up.

The various boxes in the manual reset switch routine of FIG. 9 are identified as follows:

302—Read manual reset switch bit MRB. Compare with memory bit MMRB.

303—Same?

304—Increment manual reset change counter MRCC test value against MRCC threshold.

305—Greater than threshold?

306—Test manual switch on

307—On?

308—Set manual reset flag for addressed channel: n

309—Transfer manual reset bit to memory MMRBn

310—Clear manual reset counter

311—Return to main routine

Continuous measurement of the lining wear rate is provided by a kilometer count which is commenced at each new set of linings in each brake. At the point where the new linings are installed, the figure developed for the previous set of linings is used as the starting point and, as wear takes place on these "new" linings, data is accumulated to take over gradually from the starting figures as shown in FIG. 11.

The various boxes of the wear rate calculation routine of FIG. 11 are as follows:

320—Test channel wear bit flag

321—Set?

322—calculate wear from Max Wear Const-[current reading-wear out target]

Read Km counter. Form new Km/wear bit by division.

323—Test wear>wear constant.

324—>Wear constant?

325—Use new Km/bit only

326—Form $$\frac{(W - \text{Wear}) \cdot \text{Old } Km/\text{bit} + (\text{Wear}) \text{ New } Km/\text{bit}}{W}$$

327—From Wear-to-go calculate distance-to-go

DTG from DTG=(Wear-to-go).Km/Wear bit

328—Prepare Distance-to-go as a diagnostic message.

The various boxes of the wheelspeed pulse interrupt routine of FIG. 10 are as follows:

332—Increment wheel speed count WSC. Test against stored pulse/Km figure

333—Less than pulse/Km?

334—Increment Km counter

335—Return from INTERRUPT

Figure 8:
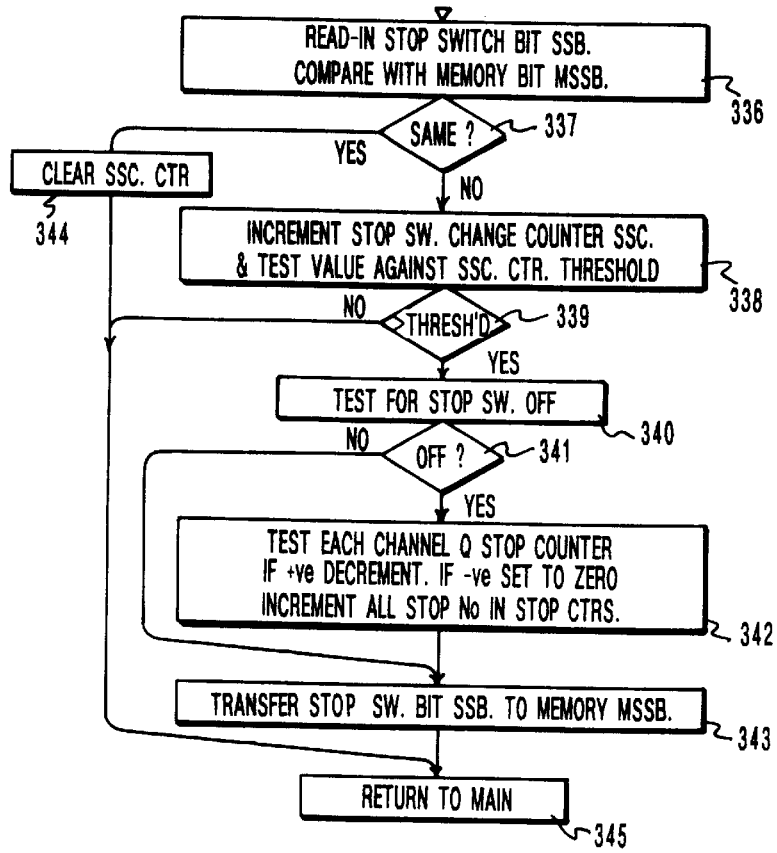
FIG. 8 is a flow diagram of a stop switch routine which can be performed by the system of FIG. 5.

The various boxes in the STOP SWITCH routine of FIG. 8 and the STOP SWITCH CHECK routine of FIG. 12 are as follows:

336—Read in stop switch bit SSB.

Compare with memory bit MSSB

337—Same?

338—Increment stop switch change counter SSC and test value against SSC counter threshold.

339—Greater than threshold?

340—Test for stop switch OFF.

341—OFF?

342—Test each channel zero stop counter If positive, decrement. If negative set to ZERO. Increment all stop numbers in STOP counters.

343—Transfer STOP switch bit SSB to memory MSSB.

344—Clear SSC counter

345—Return to MAIN ROUTINE

The various boxes in the STOP SWITCH CHECK routine FIG. 12 are as follows:

346—Test channel wear bit flag WBF

347—Set?

348—Read channel stop number from counter. Compare with previous stop number stored in.

329—Repeat for other channels

330—Return to main routine.

The routine of FIG. 11 is entered each time a further increment of wear is detected and wear is calculated from the starting point of wear with new pads which is known as the max constant wear-to-go figure. The corresponding Km count is read and a wear rate is formed at 322 by division i.e. Km/bit. The wear level measured is tested at 323, 324 and if a substantial wear level is detected the newly calculated figure of Km/bit is used alone. For less wear, a composite wear rate figure is formed at 328 from:

$$\frac{(W - \text{Wear}) \text{ OLD } Km/\text{bit} + (\text{wear}) \text{ New } Km/\text{bit}}{W}$$

where W in mm is the wear level at which change over to the all new wear rate is made and can have a preset value at any percentage of lining thickness, with 70%–80% being typical.

The wear rate generated is used at 327 with the "wear-to-go" figure to form the "distance-to-go" DTGn figure which is output at 328 as diagnostic data for each channel independently. When the equipment is built initially, an estimated default value will be programmed into the non-volatile RAM for use as the old wear rate and is based upon typical test data for the particular vehicle and brake.

FIG. 10 shows a simple Km count accumulation routine which operates on wheel speed sensor interrupt and has a programmable pulses/Km constant which again is inserted at initial vehicle build.

NVRAM at last wear bit change

349—Numbers the same?

350—Give warning of brake switch fault

Prepare diagnostic message.

351—Write new stop number into stop number store.

352—Repeat for OTHER CHANNELS

353—Return to MAIN ROUTINE.

Figure 13:
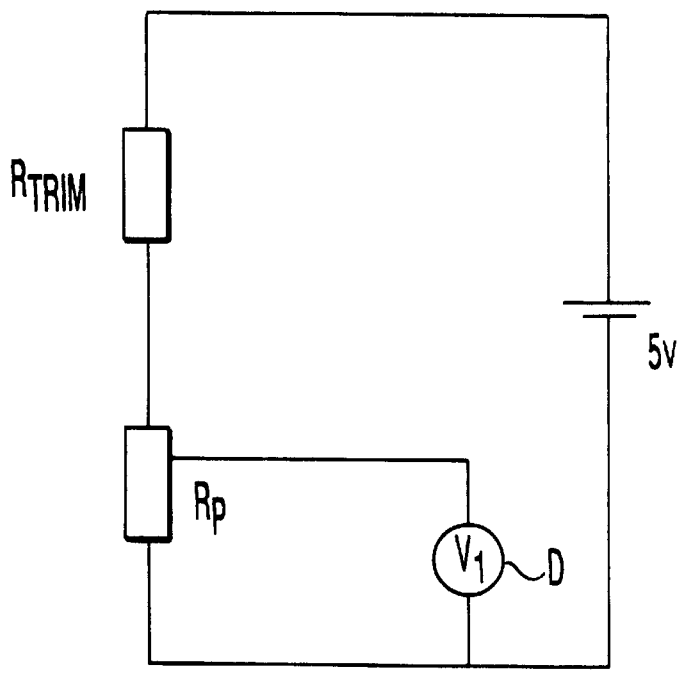
FIG. 13 is a circuit diagram illustrating one means by which the outputs of a plurality of wear sensors can be trimmed to an optimum value.

A further problem in connection with a lining wear measurement systems of the type with which the present invention is concerned is to accommodate the fact that, particularly with mass produced sensors, significant output variations are found between difference sensors due to manufacturing tolerances. A means is therefore needed for harmonizing the outputs characteristic of such wear sensors to an optimum level. One means of achieving this is described hereinafter in connection with FIG. 13 of the accompanying drawings.

As explained hereinbefore, in-brake wear sensors are designed to indicate pad lining wear. As the pads wear the brake disc also wears. Since an in-brake wear sensor is driven from the brake adjuster mechanism it measures the sum of pad and disc wear. This means that the brake pads could reach their worn out condition over a range (or band) of sensor output span, dependent on how worn the disc is. This range of sensor output is known as the "worn-out band". The start of the worn-out band represents the point at which a set of pads would be worn out if used against a new disc. This is a point out which disc damage cannot occur, regardless of the condition of the disc whilst achieving reasonable pad wear. This point is known as the "default point". The default point could be used to great advantage in a control strategy if all wear sensors were to give the same output at this point, that is if all wear sensors give the same output room their sensing potentiometer after a fixed number of electrical turns. This would also have the further major benefit of making the output per turn for each sensor the same, provided the output was linear.

In practice in-brake wear sensors usually utilize a relatively simple PCB trimming potentiometer from which the output per turn varies considerably from potentiometer to potentiometer.

In order to overcome this problem and achieve harmonization of the potentiometer outputs, a resistor $^R$TRIM is added in series with the potentiometer track resistance Rp and the resistance value of $^R$TRIM is trimmed, for example by laser treatment, to a value which brings the potentiometer output to a specific value when the potentiometer is set at a specific number of electrical turns. The specific number of electrical turns is preferably selected to be the number of turns which puts the potentiometer at the "default point". Thus, referring to FIG. 13, the trimming resistor $^R$TRIM is adjusted such as to set the voltage $V_1$ at the potentiometer wiper, as measured by a voltage detector D, to a specific value, with the number of turns T of the wiper set to the number of electrical turns equivalent to the default point.

What is claimed is:

1. A lining wear measurement system, operating from a displacement sensor coupled to a moving element within a vehicle brake, the system having a microprocessor controller, a system memory adapted to hold internally in said system memory a starting point and a target wear-out point representing a minimum acceptable brake lining thickness based upon the characteristics of known linings, which comprises:
   (a) a first device which recognizes an opening operation of the brake, such as is necessary to remove worn linings for inspection and replacement purposes, by comparison of pre-opening and post-opening brake position readings which are taken from either measurements or measurement averages, which are stored in said system memory, at least said pre-opening reading being stored in non-volatile memory so as not to lose data when system power is turned off;
   (b) a second device located within the microprocessor controller for establishing that the brake has been equipped with a new unused seat of linings;
   (c) a third device effective after a determination has been made by said first device that the brake has been equipped with a set of new unused linings, to generate and automatically set into the memory a new reference datum for wear measurements; and
   (d) a fourth device effective to generate and set into the memory a target wear-out point, representing a minimum acceptable brake lining thickness, obtained by subtracting from said new references datum the known thickness of new unused linings, thereby enabling the target wear-out point to take into account the reducing disc or drum thickness as the life of the brake progresses.

2. A lining wear measurement system, operating from a displacement sensor coupled to a moving element within a vehicle brake, the system having a microprocessor controller, a system memory adapted to hold internally in said memory a starting point and a target wear-out point representing a minimum acceptable brake lining thickness based upon the characteristics of known linings, which comprises:
   (a) first device for recognizing an opening operation of the brake, such as is necessary to remove worn linings for inspection and replacement purposes, by comparison of pre-opening and post-opening brake position readings which are taken from either measurements or measurement averages, which are stored in said system memory, at least said pre-opening reading being stored in non-volatile memory so as not to lose data when system power is turned off;
   (b) a second device for establishing that the brake has been equipped with a new unused set of linings;
   (c) a third device effective after a determination has been made that the brake has been equipped with a set of new unused linings, to manually initiate the generating and setting into the memory of a new reference datum for wear measurements; and
   (d) a fourth device effective for generating and setting into the memory a target wear-out point, representing a minimum acceptable brake lining thickness, obtained by subtracting from said new reference datum the known thickness of new unused linings, thereby enabling the target wear-out point to take into account the reducing disc or drum thickness as the life of the brake progresses.

3. A lining wear measurement system as claimed in claim 1, wherein said second device is also able to establish that the brake has been re-equipped with a previously fitted set of brake linings and a fifth device effective to decide to maintain the existing reference datum and target wear-out point.

4. A lining wear measurement system as claimed in claim 3, including a sixth device such that said post-opening reading after the brake has been opened up is not accepted immediately upon either detection of said opening or receiving of said manual initiation signal but is only accepted after a pre-set substantial number of brake applications, by which time any starting clearance has been taken up by an auto-adjuster and said post opening measurement has become a true reading of drum/disc and lining dimensions.

5. A lining wear measurement system as claimed in claim 4, including a teaching device such that said accepted post-opening reading, after having said stored pre-opening reading subtracted therefrom, is tested for use as the new starting point figure by comparison against a first threshold such that when said first threshold is exceeded, said post opening reading is caused to be accepted as a new starting point and a new wear-out target is calculated and overwritten into the non-volatile memory so as to supersede the previous figure and allow such new wear out target to be compared with subsequent reading averages to calculate the remaining lining thickness for display and brake control purposes.

6. A system as claimed in claim 5, wherein if said first threshold is not exceeded by said post-opening reading, said post-opening is arranged compared against a second, lower threshold and if said lower threshold is also not exceeded, said post opening reading is abandoned and no change is made to said stored wear-out target.

7. A system as claimed in claim 6, wherein if said first threshold is not exceeded but said second threshold is, a new starting point is not set and a default wear-out point is arranged to be set which is higher than would normally be used as a representation of the wear-out point with a brand new disc/drum and so prevents any possibility of damage being caused by complete wearing of all lining.

8. A lining wear measurement system as claimed in claim 1, including a comparing device comparing the lining remaining quantity for each brake on an axle with the corresponding quantify from the brake at the opposite end of the axle and a device comparing the differential wear measurement obtained with a pre-set wear difference threshold which, if exceeded, is arranged to cause a warning signal to be displayed to a driver or to service personnel.

9. A lining wear measurement system as claimed in claim 1, including a device for accepting wear signals from a plurality of wear sensors on a multiplex basis, a device allowing a display to be switched to each brake in turn to read out one of the number of the brake being addressed as an identifying icon, the lining wear remaining and either of any differential and a wear-out warning which is present.

10. A system as claimed in claim 9, wherein, under normal running, said display arranged is to be automatically set to the braking channel having the minimum lining remaining and is stepped round all channels on command from a panel button or external signal.

11. A system as claimed in claim 5, wherein where said post-opening reading is greater than said first threshold and the new starting point is entered, the standard lining dimension total being subtracted from this figure and the result being stored as the disc/drum dimension in a location in non-volatile memory, for diagnostic purposes.

12. A system as claimed in claim 11, wherein said stored result is arranged to overwritten at a subsequent point when brake linings are renewed, with a warning being arranged to be given should the disc/drum dimension fall outside of the recommended working range.

13. A system as claimed in claim 1, for a vehicle braking system which includes a brake light switch which is operated whenever the vehicle brakes are involved, and comprising a device checking for failure of the operation of said brake light switch by counting the number of brake applications which have occurred for every unit wear on the lining dimension, said member also being arranged to be used in non-volatile memory over periods of power removal.

14. A system as claimed in claim 1, which comprises an ECU which receives wheel speed pulses and which is arranged to divide the number of pulses by a pre-set figure stored in NV memory to generate a signal pulse at each unit distance in kilometers traveled, a counting device for counting the latter signal and using the same to establish a figure of kilometers traveled per unit lining wear which is stored and updated as use of the lining progresses, and a device for making a projection as to the number of units of distance or kilometers left on each lining.

15. A system as claimed in claim 1, including a plurality of said displacement sensors which are of a type which includes a potentiometer track and a displaceable wiper, wherein a respective trimming resistor is included in series with the potentiometer tracks of the various movement sensors, the trimming resistors being trimmed to a value which brings the potentiometer output to a specific value when the potentiometer wiper is set at a specific number of electrical turns.

16. A system as claimed in claim 15, wherein said specific number of electrical turns is selected to be the number of turns which puts the potentiometer at a default point at which disc damage cannot occur.

17. A lining wear measurement system as claimed in claim 2, including a device such that said post-opening reading after the brake has been opened up is not accepted immediately on either of detection of said opening and said manual initiation signal being received but is only accepted after a pre-set substantial number of brake applications, by which time any starting clearance has been taken up by an auto-adjuster and said post opening measurement has become a true reading of drum/disc and lining dimensions.

18. A lining wear measurement system as claimed in claim 17, including a device such that said accepted post-opening reading, after having said stored pre-opening reading subtracted therefrom, is tested for use as the new starting point figure by comparing it against a first threshold such that when said first threshold is exceeded this post opening reading is caused to be accepted as a new starting point and a new wear-out target is calculated and overwritten into the non-volatile memory so as to supersede the previous figure and allow this new worn out figure to be compared with subsequent reading averages to calculate the remaining lining thickness for display and brake control purposes.

19. A system as claimed in claim 17, wherein if said first threshold is not exceeded by said post-opening reading, said post-opening reading is arranged to be compared against a second, lower threshold and if said lower threshold is also not exceeded, said post opening reading is arranged to be abandoned and no change is made to said stored wear-out target point.

20. A system as claimed in claim 19, wherein if said first threshold is not exceeded but said second threshold is, a new starting point is not set and a default wear-out point is arranged to be set which is higher than would normally be used as it represents the wear-out point with a brand new disc/drum and so prevents any possibility of damage being caused by complete wearing of all lining.

21. A lining wear measurement system as claimed in claim 2, including a first comparing device for comparing the quantity of lining remaining for each brake on an axle with the corresponding quantity from the brake at the opposite end of the axle and a second comparing device for comparing the differential wear measurement obtained with a pre-set wear difference threshold which, if exceeded, is arranged to cause a warning signal to be displayed to the driver or service personnel.

22. A lining wear measurement system as claimed in claim 2, including a device for accepting wear signals from a plurality of wear sensors on a multiplex basis, and a device allowing a display to be switched to each brake in turn to read out one of the numbers of the brake being addressed an identifying icon, the lining wear remaining and either of any differential and wear-out warning which is present.

23. A system as claimed in claim 22, wherein, under normal running, said display arranged is automatically set to the braking channel having the minimum lining remaining but can be stepped around all channels on command from a panel button or external signal.

24. A system as claimed in claim 14, wherein where said post-opening reading is greater than said first threshold and the new starting point is entered, the standard lining dimension total is subtracted from this figure and the result is stored as the disc/drum dimension in a location in non-volatile memory, for diagnostic purposes.

25. A system as claimed in claim 24, wherein said stored result is arranged to be overwritten at a subsequent point when brake linings are renewed, with a warning being arranged to be given should the disc/drum dimension fall outside of the recommended working range.

26. A system as claimed in claim 2 for a vehicle braking system, which includes a brake light switch which is operated whenever the vehicle brakes are applied, comprising a device for checking for failure of the operation of said brake light switch by counting the number of brake applications which have occurred for every unit wear on the lining dimension, this parameter also being arranged to be used in non-volatile memory over periods of power removal.

27. A system as claimed in claim 2, which comprises an ECU which receives wheel speed pulses and is arranged to divide these by a pre-set figure stored in NV memory to generate a signal pulse at each unit distance or kilometer traveled, and a device for counting the latter signal and using the same to establish a figure in terms of kilometers traveled per unit lining wear which is stored and updated as use of the lining progresses, and means for making a projection as to the number of units of distance or kilometers left on each lining.

28. A system as claimed in claim 2, including a plurality of said replacement sensors which are of a type which includes a potentiometer track and a displaceable wiper, and wherein a respective trimming resistor is included in series with the potentiometer tracks of the various movement sensors, the trimming resistors being trimmed to a value which brings the potentiometer output to a specific value when the potentiometer wiper is set at a specific number of electrical turns.

29. A system as claimed in claim 28, wherein said specific number of electrical turns is selected so as to be the number of turns which puts the potentiometer at a default point at which disc damage cannot occur.

* * * * *